United States Patent
Zhang et al.

(10) Patent No.: US 8,693,524 B2
(45) Date of Patent: Apr. 8, 2014

(54) SYNCHRONIZATION METHOD FOR IMPULSE SYSTEM ULTRA-WIDEBAND

(75) Inventors: Zaichen Zhang, Nanjing (CN); Liang Wu, Nanjing (CN); Xutao Yu, Nanjing (CN); Guangguo Bi, Nanjing (CN); Xiaohu You, Nanjing (CN)

(73) Assignee: Southeast University, Jiangsu (CN)

( * ) Notice: Subject to any disclaimer, the term of this patent is extended or adjusted under 35 U.S.C. 154(b) by 43 days.

(21) Appl. No.: 13/498,572

(22) PCT Filed: Sep. 28, 2009

(86) PCT No.: PCT/CN2009/074287
§ 371 (c)(1),
(2), (4) Date: Jun. 11, 2012

(87) PCT Pub. No.: WO2011/035494
PCT Pub. Date: Mar. 31, 2011

(65) Prior Publication Data
US 2012/0243577 A1  Sep. 27, 2012

(51) Int. Cl.
*H04B 1/00* (2006.01)

(52) U.S. Cl.
USPC ........... 375/145; 375/149; 375/142; 375/150; 375/354; 375/343; 375/364; 375/365; 375/349; 375/367; 375/368; 375/366; 375/E1.002; 375/E1.022; 375/E1.037; 370/350; 370/349; 370/509; 370/510; 370/512; 370/514; 370/515; 370/520

(58) Field of Classification Search
USPC ......... 375/145, 149, 142, 150, 354, 343, 364, 375/365, 349, 367, 368, 366, E1.002, 375/E1.022, E1.037; 370/350, 349, 509, 370/510, 512, 514, 515, 520
See application file for complete search history.

(56) References Cited

U.S. PATENT DOCUMENTS 7,613,257 B2 * 11/2009 El Fawal et al. .............. 375/343
2010/0182993 A1 * 7/2010 Jurgensen et al. ............ 370/350

FOREIGN PATENT DOCUMENTS

| CN | 101079688 A | 11/2007 |
|---|---|---|
| CN | 101083482 A | 12/2007 |
| CN | 101667850 A | 3/2010 |
| JP | 2006-60736 | 3/2006 |

OTHER PUBLICATIONS

International Search Report, corresponding to PCT/CN2009/074287, dated Jul. 8, 2010, 6 pages.

* cited by examiner

*Primary Examiner* — Daniel Washburn
*Assistant Examiner* — Rahel Guarino
(74) *Attorney, Agent, or Firm* — Christie, Parker & Hale, LLP

(57) ABSTRACT

A synchronization method for impulse system ultra-wideband takes frame as basic unit for data transmission, each frame is divided into a preamble symbol part and a data part, wherein the preamble symbol part sends a known impulse sequence for channel estimation and synchronization; the data part takes the information to be transmitted; the preamble symbol part is divided into two parts of a positive and negative impulse sequence, which includes odd impulses with alternant positive and negative polarities, and a same direction impulse sequence, which is composed of impulses with same polarity and is the same as the polarity of the last impulse in the positive and negative impulse sequence. The method provides such advantages as high synchronization precision, small storage space, and capability of immediately finding out the synchronization position etc., and provides an important value for the development of the impulse system ultra-wideband wireless communication technique.

2 Claims, 1 Drawing Sheet

SYNCHRONIZATION METHOD FOR IMPULSE SYSTEM ULTRA-WIDEBAND

CROSS-REFERENCE TO RELATED APPLICATION(S)

This application is a National Phase Patent Application and claims priority to and benefit of International Application Number PCT/CN2009/074287, filed on Sep. 28, 2009, the entire disclosure of which is incorporated herein by reference.

FIELD OF THE INVENTION

The present invention relates to a method to realize the fast synchronization in impulse system high speed ultra-wideband (UWB) wireless communication systems, and it falls in the technical field of short-distance wireless communication and dissemination of information.

BACKGROUND OF THE INVENTION

As one of the core techniques in the future ubiquitous wireless communication, the UWB wireless communication technique has attracted wide attention in recent years, and its development has made remarkable progress.

The way to realize UWB technique can be generally divided into two basic implementation mode of impulse system and carrier wave system. The impulse system UWB transmits information by using baseband pulse sequence, has the advantages of simple system structure, low cost, low power consumption and the like, and has gained a wide range of applications in wireless communication, distance measurement, exploration fields; on the other hand, carrier wave system UWB, by using mature modulated continuous carrier wave and Orthogonal Frequency Division Multiplexing (OFDM) technology, etc., has gained high efficiency in spectrum utilization and flexibility in using spectrum resources. Under the impulse system UWB technology, the receiving end can use peak detection, energy detection, simulation correlation detection methods etc., hence its processing performance is restricted by simulation manipulation and generally only a lower speed wireless communication, exploration, positioning and other functions can be realized; the receiving end can also use high speed sampling methods and perform digital processing through low-precision quantification, hence it has the advantages of stable performance and easy integration, and can achieve a higher speed in wireless transmission.

In impulse-UWB of high speed sampling system, one of the difficulties is to achieve synchronization. In the existing synchronization method, it obtains estimation on synchronization position by using the periodic or pseudorandom characteristics of synchronization sequence and by performing energy correlation or sliding correlation on the sampled data. However, in the impulse-UWB system, since the sampling rate is extremely high, it can only carry out the quantification of the sampled value with low precision at one bit or two bits and produces large quantification noises due to the constraints on power consumption and processing capacity of the system, and hence the above-mentioned existing synchronization method can no longer be used. In this situation, a feasible method is to estimate the channel impulse response through the accumulation of multiple periodic signals, and to search the peak position of channel estimation in the cumulative process and to take this peak position as the synchronization reference position. This method is a sliding cumulative process and needs large amounts of calculation; further, because the peak position cannot be determined instantaneously, it is necessary to check over a long enough period of time before the determination can be reached, hence resulting in the need for large storage space and causing delay in processing.

DESCRIPTION OF THE INVENTION

Technical problems: The present invention provides a synchronization method applicable to impulse system UWB wireless communication systems of high speed sampling and low precision quantification, and it has the advantages of fast synchronization speed, high precision and low implementation complexity, etc.

Technical solutions: The synchronization method provided in this invention has the frame structure as shown in FIG. 1.

In this method, the frame is the basic unit in data transmission. Each frame comprises a preamble symbol part and a data part, wherein the preamble symbol part transmits known pulse sequence which is used for channel estimation and synchronization, while the data part carries the information to be transmitted. The preamble symbol part further comprises two parts of positive and negative pulse sequence and co-current pulse sequence; the front part of which is the positive and negative pulse sequence and contains an odd number of impulses with alternant positive and negative polarities, while the rear part of which is the co-current pulse sequence and consists of impulses of same polarity; and the impulse polarity in the co-current pulse sequence is the same as the impulse polarity of the last impulse in positive and negative pulse sequence. The preamble symbol part has the same impulse interval.

The synchronization method is shown in FIG. 2. The sampled data enter, in parallel, into sampling data memory; the sampling data memory has the width equal to the number of sampled value within each impulse cycle and the depth of the sampling data memory is the length of positive and negative impulse sequence. In the initial state, the value in the sampling data memory is 0; in each clock cycle, the new sampled data enter, from the top, into the sampling data memory, while the data at the bottom-most of the sampling data memory are shifted out. The channel estimation memory saves the estimated value of current channel impulse response and has its initial value of 0. In each clock cycle, the subtracter performs the subtraction, at each of the corresponding positions, of the row of data at the bottom-most of the sampling data memory from the data in current channel estimation memory, obtaining difference values, and then sends the resulting difference values to the phase inverter; the phase inverter multiplies the difference values by −1, and then sends the results to the adder; the adder performs the addition, at each of the corresponding positions, of the output from the phase inverter and the row of data at the top-most of the sampling data memory, obtaining sum values, and then sends the resulting sum values to the delayer; the delayer performs time delay on these values, and updates the values in the channel estimation memory before the start of next clock cycle; in the current clock cycle, the correlator performs the correlation of the row of data at the top-most of sampling data memory with the data in the channel estimation memory, that is, it first performs multiplication of the data at the corresponding positions followed by summation, and then sends the correlation results to decision device; the decision device performs judgment according to the input of correlation results: if the input is less than 0, then the output is 0, while if the input is greater than or equal to 0, then the output is 1; the decision device sends the judgment results to a First In First Out (FIFO) queue, and in the initial state, the value on the FIFO queue is 1; each data from the decision device enters, from the left, into the FIFO queue, and sequentially moves the original data on FIFO queue to the right, and shifts out the rightmost data on the FIFO queue from the FIFO queue; the summation comparator performs summation operation on all current data on FIFO queue, and compares the summation results with the preset threshold values, when the summation result is equal to the threshold value, synchronization signal will be output, otherwise there will be no output.

The beneficial effects: The synchronization method provided in this invention is applicable to the impulse system UWB wireless communication system of high speed sampling and low precision quantification. Compared with the existing synchronization methods, the method provided in the invention has the advantages of high synchronization precision, small storage space required, and ability to locate synchronization position in real-time, etc., and hence it has important values for the development of impulse system UWB wireless communication technique.

| Description of drawing symbols | |
| --- | --- |
| 1 sampling data memory | 2 channel estimation memory |
| 3 subtracter | 4 phase inverter |
| 5 adder | 6 delayer |
| 7 correlator | 8 decision device |
| 9 FIFO queue | 10 summation comparator |

Figure 1:
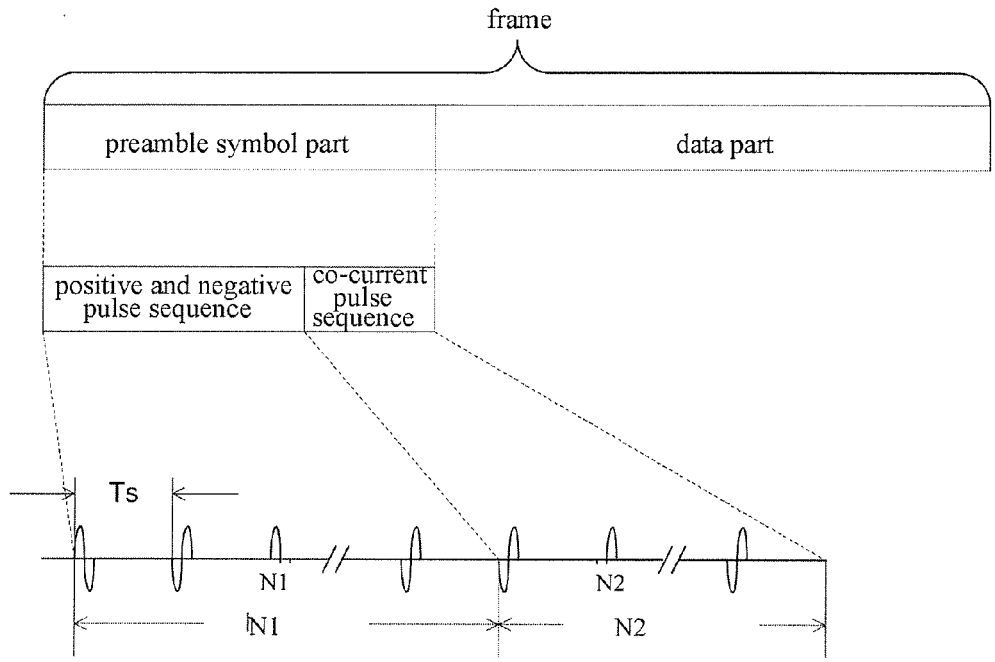
FIG. 1 shows the frame structure of the invention.

The embodiment of the invention:
The following is a embodiment of the invention.
The frame structure is shown in FIG. 1. Each frame is divided into a preamble symbol part and a data part, wherein the preamble symbol part transmits known pulse sequence which is used for channel estimation and synchronization, while the data part carries the information to be transmitted. The preamble symbol part further comprises two parts of positive and negative pulse sequence and co-current pulse sequence; the front part of which is the positive and negative pulse sequence and contains 1023 pulses of polarity alternation between positive and negative pulses with the first pulse being positive, while the rear part of which is the co-current pulse sequence and consists of 10 positive pulses. The pulse interval in the preamble symbol part is 60.6 ns.

Figure 2:
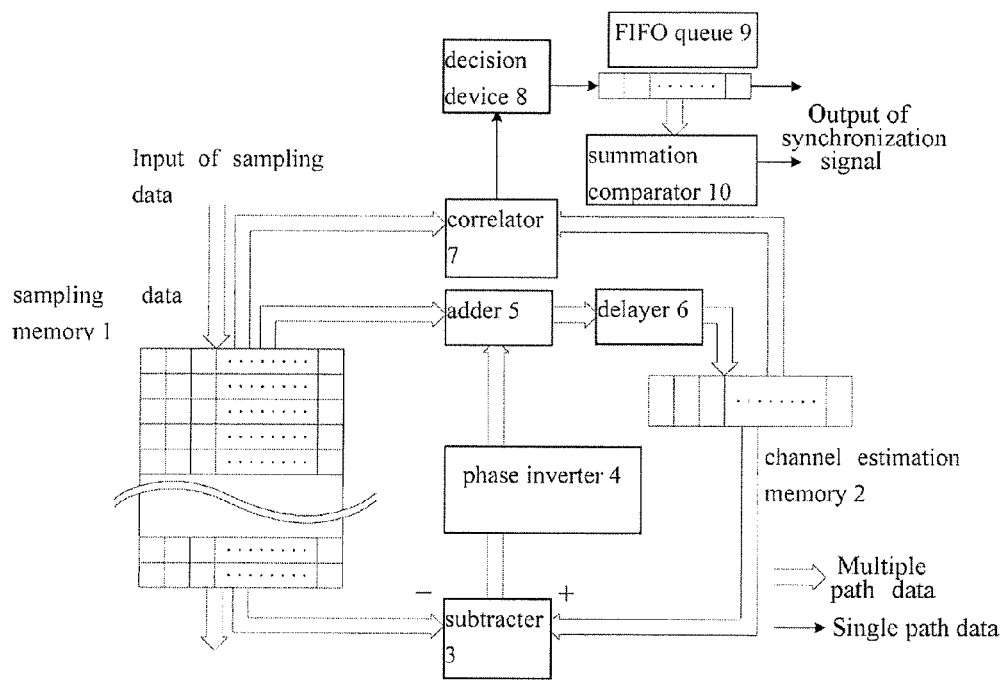
FIG. 2 is the block diagram of synchronization method provided in the invention.

The synchronization method is shown in FIG. 2. The sampling rate is 4224 MHz. The sampled data enter, in parallel, into the sampling data memory; the sampling data memory has the width of 256 and the depth of 1023. In the initial state, the value in the sampling data memory is 0. In each clock cycle, the new sampled data enter, from the top, into the sampling data memory, while the data at the bottom-most of the sampling data memory are shifted out. The channel estimation memory saves the estimated value of current channel impulse response and its storage capacity is 1023 data with each datum having 10 bits and its initial value being 0. In each clock cycle, the subtracter performs the subtraction, at each of the corresponding positions, of 1023 data on the bottom-most row of the sampling data memory from the 1023 data in current channel estimation memory, resulting in 1023 difference values, and then sends these difference values to the phase inverter. The phase inverter multiplies these 1023 difference values by −1, and then sends the results to the adder. The adder performs the addition, at each of the corresponding positions, of the output from the phase inverter and the 1023 data at the top-most row of the sampling data memory, resulting in 1023 sum values, and then sends these sum values to the delayer. The delayer performs time delay on these 1023 values, and updates the values in the channel estimation memory before the start of the next clock cycle. In the current clock cycle, the correlator performs the correlation of the 1023 data at the top-most row of sampling data memory with the 1023 data in the channel estimation memory, that is, it first performs multiplication of the data at each of the corresponding positions followed by summation of these 1023 products, and then sends the correlation results to the decision device. The decision device performs judgment according to the input correlation results: if the input is less than 0, then the output is 0, if the input is greater than or equal to 0, then the output is 1. The decision device sends the judgment results to a First In First Out (FIFO) queue which has the length of 5, and in the initial state, the value on the FIFO queue is 1. Each data from the decision device enters, from the left, into the FIFO queue, sequentially moves the original data on FIFO queue to the right, and shifts out the rightmost data on the FIFO queue from the FIFO queue. The summation comparator performs summation operation on all 5 current data on FIFO queue, and compares the summation results with the preset threshold value which is 2. When the summation result is equal to the threshold value of 2, synchronization signal will be output, otherwise there will be no output.

The invention claimed is:
1. An impulse system ultra-wideband (UWB) synchronization method, characterized in that: the method uses frames as the basic unit in data transmission; each frame is divided into a preamble symbol part and a data part, wherein the preamble symbol part transmits known pulse sequence which is used for channel estimation and synchronization, while the data part carries the information to be transmitted; the preamble symbol part further comprises two parts of positive and negative pulse sequence and co-current pulse sequence; the front part of which is the positive and negative pulse sequence and contains odd number of impulses with alternant positive and negative polarities, while the rear part of which is the co-current pulse sequence and consists of impulses of same polarity; and the impulse polarity in the co-current pulse sequence is same as the impulse polarity of a last impulse in the positive and negative pulse sequence.

2. The impulse system UWB synchronization method according to claim 1, characterized in that said synchronization method has the following specifics: sampled data enters, in parallel, into a sampling data memory (1); the sampling data memory (1) has a width equal to a number of sampled values within each impulse cycle; the sampling data memory (1) has a depth equal to a length of the positive and negative pulse sequence; in an initial state, the number of sampled values in the sampling data memory (1) is 0 (zero); in each clock cycle, new sampled data enters, from a top, into the sampling data memory (1); data at a bottom-most of the sampling data memory (1) are shifted out; channel estimation memory (2) saves an estimate value of current channel impulse response and has its initial value of 0 (zero); in each clock cycle, a subtracter (3) performs subtraction, at each of the corresponding positions, of a row of data at the bottom-most of the sampling data memory (1) from the data in current channel estimation memory (2), obtaining difference values, and then sends the resulting difference values to a phase inverter (4); the phase inverter (4) multiplies the difference values by −1, and then sends the results to an adder (5); the adder (5) performs addition, at each of the corresponding positions, of the output from the phase inverter (4) and a row of data at the top-most of the sampling data memory (1), and then sends the resulting sum values to a delayer (6); the delayer (6) performs time delay on these values, and updates the values in the channel estimation memory (2) before the start of a next clock cycle; in the current clock cycle, a correlator (7) performs correlation of the row of data at the top-most of sampling data memory with the data in the channel estimation memory (2), that is, it first performs multiplication of the data at each of the corresponding positions followed by summation, and then sends the correlation results to a decision device (8); the decision device (8) performs judgment according to the input of correlation results: if the input is less than 0 (zero), then an output is 0(zero), if the input is greater than or equal to 0 (zero), then the output is 1; the decision device (8) sends judgment results to a First In First Out (FIFO) queue (9), and in an initial state, the value on the FIFO queue (9) is 1; each data from the decision device (8) enters, from the left, into the FIFO queue (9), and sequentially moves an original data on FIFO queue (9) to the right, and shifts out a rightmost data on the FIFO queue (9) from the FIFO queue (9); a summation comparator (10) performs summation operation on all current data on FIFO queue (9), and compares the summation results with preset threshold values: when the summation result is equal to the threshold value, synchronization signal will be output, otherwise there will be no output.

\* \* \* \* \*

UNITED STATES PATENT AND TRADEMARK OFFICE
CERTIFICATE OF CORRECTION

PATENT NO.         : 8,693,524 B2  
APPLICATION NO.    : 13/498572  
DATED              : April 8, 2014  
INVENTOR(S)        : Zhang et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 118 days.

Signed and Sealed this

Twenty-ninth Day of September, 2015

Michelle K. Lee
*Director of the United States Patent and Trademark Office*